(12) United States Patent
Yang et al.

(10) Patent No.: US 11,240,745 B2
(45) Date of Patent: Feb. 1, 2022

(54) NETWORK SLICE INSTANCE PROCESSING METHOD AND APPARATUS, AND SYSTEM

(71) Applicant: Huawei Technologies Co., Ltd., Shenzhen (CN)

(72) Inventors: Shuigen Yang, Shanghai (CN); Wenqi Sun, Shenzhen (CN); Wei Lu, Shenzhen (CN); Wei Tan, Shanghai (CN); Zhenni Feng, Shenzhen (CN); Ruobing Jiang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 20 days.

(21) Appl. No.: 16/811,810

(22) Filed: Mar. 6, 2020

(65) Prior Publication Data

US 2020/0213937 A1   Jul. 2, 2020

Related U.S. Application Data

(63) Continuation of application No. PCT/CN2018/103344, filed on Aug. 30, 2018.

(30) Foreign Application Priority Data

Sep. 8, 2017  (CN) .......................... 201710807964.0

(51) Int. Cl.
*H04W 48/18* (2009.01)
*H04L 12/24* (2006.01)
*H04W 24/02* (2009.01)

(52) U.S. Cl.
CPC ......... *H04W 48/18* (2013.01); *H04L 41/0806* (2013.01); *H04L 41/0893* (2013.01);
(Continued)

(58) Field of Classification Search
CPC .. H04W 48/18; H04W 24/02; H04L 41/0806; H04L 41/0893; H04L 41/12;
(Continued)

(56) References Cited

U.S. PATENT DOCUMENTS

| | | | | |
|---|---|---|---|---|
| 4,696,027 A | * | 9/1987 | Bonta | H04W 52/40 |
| | | | | 455/436 |
| 5,821,821 A | * | 10/1998 | Ahdab | H03K 3/0315 |
| | | | | 331/57 |

(Continued)

FOREIGN PATENT DOCUMENTS

| CN | 106982458 A | 7/2017 |
|---|---|---|
| CN | 107071799 A | 8/2017 |

OTHER PUBLICATIONS

"Study on Management and Orchestration of Network Slicing for Next Generation Network (Release 15)," 3GPP TR 28.801 V1.2.0, 3rd Generation Partnership Project; Technical Specification Group Services and System Aspects, Telecommunication Management, May 2017, 82 pages.

(Continued)

*Primary Examiner* — Wing F Chan
*Assistant Examiner* — Billy H Ng
(74) *Attorney, Agent, or Firm* — Slater Matsil, LLP

(57) ABSTRACT

A network slice instance processing method and apparatus, and a system, the method including receiving, by a first network device, a first message sent by a second network device, where the first message requests that the first network device modify a first network slice subnet instance (NSSI) managed by the first network device, and where the first NSSI is shared by a plurality of network slice instances (NSIs) managed by different network devices, determining, by the first network device, whether the first NSSI is allowed to be modified, and performing, by the first network device,
(Continued)

subsequent processing according to a determination of whether the first NSSI is allowed to be modified.

20 Claims, 4 Drawing Sheets

(52) U.S. Cl.
CPC .......... *H04L 41/12* (2013.01); *H04L 41/5051* (2013.01); *H04W 24/02* (2013.01)

(58) Field of Classification Search
CPC ............. H04L 41/5051; H04L 41/0886; H04L 41/0823; H04L 41/5025; H04L 41/06; H04L 41/50
USPC ......................................................... 370/354
See application file for complete search history.

(56) References Cited

U.S. PATENT DOCUMENTS

| | | | | |
|---|---|---|---|---|
| 6,614,781 B1* | 9/2003 | Elliott | ............... | H04L 29/06027 370/352 |
| 8,121,716 B2* | 2/2012 | Offenmuller | .......... | G06Q 10/06 700/97 |
| 9,171,271 B2* | 10/2015 | Shasha | ................... | G06Q 10/06 |
| 9,832,684 B2* | 11/2017 | Hwang | ................ | H04W 76/20 |
| 2017/0257870 A1 | 9/2017 | Farmanbar et al. | | |
| 2019/0313467 A1* | 10/2019 | Fujishima | ............... | H04L 47/78 |
| 2020/0120589 A1* | 4/2020 | Velev | .................... | H04W 60/04 |
| 2020/0154292 A1* | 5/2020 | Bor-Yaliniz | ........ | H04L 41/5025 |
| 2020/0154401 A1* | 5/2020 | Maguire | ............... | H04L 41/145 |

OTHER PUBLICATIONS

"3rd Generation Partnership Project; Technical Specification Group Services and System Aspects; Telecommunication management; Study on Management and Orchestration of Network Slicing for Next Generation Network (Release 15)," 3GPP TR 28.801 V1.3.0, Aug. 2017, 79 pages.

"Update Potential Solution of Modifying a NSI," Source: Huawei, Document for: Approval, Agenda Item: 6.6.5, 3GPP TSG SA WG5 (Telecom Management) Meeting #113, S5-173456, May 8-12, 2017, 2 pages.

"pCR 28.801 Add Potential Solution for Managing the Shared NSSI Constituent Managed by Other NSSMF(s)," Source: Huawei, China Unicom, Ericsson, SK Telecom, Document for: Approval, Agenda Item: 6.6.3, XP051336313, 3GPP TSG SA WG5 (Telecom Management) Meeting #114, S5-174368, Aug. 21-25, 2017, 6 pages.

"pCR 28.801 Add Potential Solution for Managing the Shared NSSI," Source: Huawei, China Unicom, Ericsson, Document for: Approval, Agenda Item: 6.6.3, 3GPP TSG SA WG5 (Telecom Management) Meeting #114, S5-174469, XP051336391, Aug. 21-25, 2017, 6 pages.

* cited by examiner

NETWORK SLICE INSTANCE PROCESSING METHOD AND APPARATUS, AND SYSTEM

CROSS-REFERENCE TO RELATED APPLICATIONS

This application is a continuation of International Application No. PCT/CN2018/103344, filed on Aug. 30, 2018, which claims priority to Chinese Patent Application No. 201710807964.0, filed on Sep. 8, 2017. The disclosures of the aforementioned applications are hereby incorporated by reference in their entireties.

TECHNICAL FIELD

This application relates to the field of communications technologies, and in particular, to a network slice instance processing method and apparatus, and a system.

SUMMARY

This application provides a network slice instance processing method and apparatus, and a system, to resolve a problem of how to modify a shared network slice subnet instance (NSSI), to modify one of network slice instances (NSIs) that share the NSSI.

According to a first aspect, this application provides a network slice instance processing method. The method includes receiving, by a first network device, a first message sent by a second network device, where the first message is used to request the first network device to modify a first network slice subnet instance (NSSI) managed by the first network device, and the first NSSI is shared by a plurality of network slice instances managed by different network devices, determining, by the first network device, whether the first NSSI is allowed to be modified, and performing, by the first network device, subsequent processing based on a result of the determining.

According to the foregoing method, the first network device determines, based on the received first message, whether the first NSSI can be modified, and performs subsequent processing based on the result of the determining. Through a determining process, when the first NSSI is shared by a plurality of network slice instances (NSIs, a problem that directly modifying the first NSSI causes a negative impact on an NSI that is managed by another NSMF and that shares the first NSSI can be avoided.

In a possible design, if the first network device determines that the first NSSI is allowed to be modified, the performing, by the first network device, subsequent processing based on a result of the determining includes modifying, by the first network device, the first NSSI.

According to the method, the first network device directly modifies the first NSSI after determining that the first NSSI can be modified, thereby improving a modification speed.

In a possible design, if the first network device determines that the first NSSI is not allowed to be modified, the performing, by the first network device, subsequent processing based on a result of the determining includes creating, by the first network device, a second NSSI, and configuring, by the first network device, the second NSSI.

According to the method, after determining that the first NSSI is not allowed to be modified, the first network device creates the second NSSI of the first network device, and configures a parameter of the second NSSI. In this way, an NSI to which the first NSSI belongs is modified, and a negative impact on another NSI is avoided.

In a possible design, after the performing, by the first network device, subsequent processing based on a result of the determining, the first network device sends a second message to the second network device, where the second message is a response to the first message.

According to the method, the second network device is notified of modification performed by the first network device.

In a possible design, after the first network device determines that the first NSSI is not allowed to be modified, the first network device sends a third message to the second network device, where the third message carries related requirement information of the second NSSI that needs to be created, to indicate a support status of the first network device for a related requirement of the second NSSI, and the first network device receives a fourth message sent by the second network device, where the fourth message carries indication information, to indicate whether the first network device is allowed to create the second NSSI or whether the second network device accepts the related requirement information, carried in the third message, of the second NSSI that needs to be created.

According to the method, the related requirement information of the second NSSI that needs to be created is determined by using the third message and the fourth message, to increase a creation speed of the second NSSI.

In a possible design, if the indication information that is specific to the related requirement of the second NSSI and that is carried in the fourth message indication message is a negative indication, the fourth message further includes related requirement information, proposed by the second network device, of the second NSSI that needs to be created.

In a possible design, the first message includes identification information of the first NSSI and updated related requirement information of the first NSSI, where the related requirement information includes at least one of parameters such as a service level agreement, a key performance indicator, a type of a network slice subnet, quality of service, a network topology, a resource requirement, and a network function related requirement.

In a possible design, the first message further includes identification information of an NSI to which the first NSSI belongs.

In a possible design, the second message includes identification information of the second NSSI.

In a possible design, the second message includes identification information of an NSI to which the second NSSI belongs.

In a possible design, the configuring, by the first network device, the second NSSI includes adding, by the first network device, the second NSSI to an NSI to which the first NSSI belongs, and deleting the first NSSI from the NSI.

According to the method, NSSIs included in NSIs are updated, thereby eliminating redundancy of the NSIs.

According to a second aspect, this application provides a network slice instance processing method. The method includes sending, by a second network device, a first message to a first network device, where the first message is used to request the first network device to modify a first network slice subnet instance (NSSI) managed by the first network device, and the first NSSI is shared by a plurality of network slice instances managed by different network devices, and receiving, by the second network device, a second message sent by the first network device, where the second message is a response to the first message.

According to the foregoing method, the second network device sends the first message, and the first network device determines, based on the received first message, whether the first NSSI can be modified, and performs subsequent processing based on the result of the determining. Through a determining process, when the first NSSI is shared by a plurality of NSIs, a problem that directly modifying the first NSSI causes a negative impact on an NSI that is managed by another NSMF and that shares the first NSSI can be avoided by the first module.

In a possible design, after the sending, by a second network device, a first message to a first network device, the method further includes receiving, by the second network device, a third message sent by the first network device, where the third message carries related requirement information of the second NSSI that needs to be created, to indicate a support status of the first network device for a related requirement of the second NSSI, and sending and receiving, by the second network device, a fourth message to the first network device, where the fourth message carries indication information, to indicate whether the first network device is allowed to create the second NSSI or whether the second network device accepts the related requirement information, carried in the third message, of the second NSSI that needs to be created.

In a possible design, the indication information that is specific to the related requirement of the second NSSI and that is carried in the fourth message sent by the second network device to the first network device is a negative indication, and the fourth message further includes related requirement information, proposed by the second network device, of the second NSSI that needs to be created.

According to a third aspect, this application provides a network slice instance processing apparatus. The apparatus includes a receiving unit, configured to receive a first message sent by a second network device, where the first message is used to request a first network device, to which the receiving unit belongs, to modify a first network slice subnet instance (NSSI) managed by the first network device, and the first NSSI is shared by a plurality of network slice instances managed by different network devices, and a processing unit, configured to determine whether the first NSSI is allowed to be modified, and perform subsequent processing based on a result of the determining.

In a possible design, when performing the subsequent processing based on the result of the determining, the processing module is specifically configured to modify the first NSSI if determining that the first NSSI is allowed to be modified.

In a possible design, when performing the subsequent processing based on the result of the determining, the processing module is specifically configured to create a second NSSI if determining that the first NSSI is not allowed to be modified.

In a possible design, the processing module is further configured to configure the second NSSI after the second NSSI is created.

In a possible design, the apparatus further includes a sending unit, configured to send a second message to the second network device.

In a possible design, the sending unit is further configured to send a third message to the second network device after it is determined that the first NSSI is not allowed to be modified, where the third message carries related requirement information of the second NSSI that needs to be created, to indicate a support status of the first network device for a related requirement of the second NSSI, and the receiving unit receives a fourth message sent by the second network device, where the fourth message carries indication information, to indicate whether the first network device is allowed to create the second NSSI or whether the second network device accepts the related requirement information, carried in the third message, of the second NSSI that needs to be created.

In a possible design, if the indication information that is specific to the related requirement of the second NSSI and that is carried in the fourth message is a negative indication, the fourth message further includes related requirement information, proposed by the second network device, of the second NSSI that needs to be created.

In a possible design, the first message includes identification information of the first NSSI and updated related requirement information of the first NSSI, where the related requirement information includes at least one of parameters such as a service level agreement, a key performance indicator, a type of a network slice subnet, quality of service, a network topology, a resource requirement, and a network function related requirement.

In a possible design, the first message further includes identification information of an NSI to which the first NSSI belongs.

In a possible design, the second message includes identification information of the second NSSI.

In a possible design, the second message includes identification information of an NSI to which the second NSSI belongs.

In a possible design, when configuring the second NSSI, the processing unit is specifically configured to add the second NSSI to an NSI to which the first NSSI belongs, and delete the first NSSI from the NSI.

According to a fourth aspect, this application provides a network slice instance processing apparatus. The apparatus includes a sending unit, configured to send a first message to a first network device, where the first message is used to request the first network device to modify a first network slice subnet instance (NSSI) managed by the first network device, and the first NSSI is shared by a plurality of network slice instances managed by different network devices, and a receiving unit, configured to receive a second message sent by the first network device, where the second message is a response to the first message.

In a possible design, the receiving unit is further configured to receive a third message sent by the first network device, where the third message carries related requirement information of the second NSSI that needs to be created, to indicate a support status of the first network device for a related requirement of the second NSSI, and the sending unit is further configured to send a fourth message to the first network device, where the fourth message carries indication information, to indicate whether the first network device is allowed to create the second NSSI or whether the apparatus accepts the related requirement information, carried in the third message, of the second NSSI that needs to be created.

In a possible design, if the indication information that is specific to the related requirement of the second NSSI and that is carried in the fourth message is a negative indication, the fourth message further includes related requirement information, proposed by the second network device, of the second NSSI that needs to be created.

According to a fifth aspect, this application provides a network slice instance processing apparatus, including a communications interface, a processor, and a memory. The communications interface, the memory, and the processor. The memory is configured to store program code that needs to be executed by the processor. The communications interface is configured to receive a user task sent by a client. The processor is configured to execute the program code stored in the memory, and is specifically configured to perform the method in any one of the first and the second aspects or the possible implementations of the first and the second aspects.

According to a sixth aspect, an embodiment of this application further provides a system. For beneficial effects, refer to descriptions of the foregoing aspects, and details are not described herein again. The system includes a first network device and a second network device.

The second network device is configured to send a first message to the first network device, where the first message is used to request the first network device to modify a first network slice subnet instance (NSSI) managed by the first network device, and the first NSSI is shared by a plurality of network slice instances managed by different network devices.

The first network device is configured to receive the first message, determine whether the first NSSI is allowed to be modified, and perform subsequent processing based on a result of the determining.

In a possible design, if the first network device determines that the first NSSI is allowed to be modified, when performing the subsequent processing based on the result of the determining, the first network device may modify the first NSSI.

In a possible design, if the first network device determines that the first NSSI is not allowed to be modified, when performing the subsequent processing based on the result of the determining, the first network device may create a second NSSI.

In a possible design, the first network device may further send a second message to the second network device, where the second message is a response to the first message, and the second network device may receive the second message.

In a possible design, the first network device may further configure the second NSSI after creating the second NSSI.

In a possible design, the first network device may send a third message to the second network device after determining that the first NSSI is not allowed to be modified, where the third message carries related requirement information of the second NSSI that needs to be created, to indicate a support status of the first network device for a related requirement of the second NSSI.

Then, the second network device receives the third message, and may further send a fourth message to the first network device, where the fourth message carries indication information, to indicate whether the first network device is allowed to create the second NSSI or whether the second network device accepts the related requirement information, carried in the third message, of the second NSSI that needs to be created.

The first network device may receive the fourth message.

In a possible design, when the second network device does not accept the related requirement information, carried in the third message, of the second NSSI that needs to be created, the indication information that is specific to the related requirement of the second NSSI and that is carried in the fourth message is a negative indication, and the fourth message further includes related requirement information, proposed by the second network device, of the second NSSI that needs to be created.

According to a seventh aspect, this application further provides a computer-readable storage medium, configured to store a computer software instruction used to perform a function designed in any one of the first and the second aspects or the possible implementations of the first and the second aspects. The computer software instruction includes a program designed to perform any one of the first and the second aspects or the possible implementations of the first and the second aspects.

According to an eighth aspect, this application further provides a computer program product including an instruction, and when the computer program product is run on a computer, the computer is enabled to perform the method according to any one of the first and the second aspects or the possible implementations of the first and the second aspects.

DETAILED DESCRIPTION OF ILLUSTRATIVE EMBODIMENTS

To make the objectives, technical solutions, and advantages of this application clearer, the following further describes this application in detail with reference to the accompanying drawings.

A network slice instance processing method and apparatus are provided, to resolve a prior art problem of how to modify, when at least two NSIs managed by different NSMFs share an NSSI, the shared NSSI while causing a negative impact on another NSI. The method and the apparatus are based on a same inventive concept. Because a problem-resolving principle of the method is similar to that of the apparatus, implementations of the apparatus and the method may mutually refer to each other. No repeated description is provided.

Figure 1:
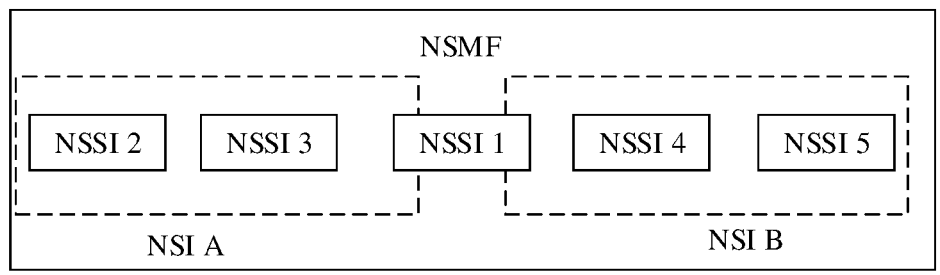
FIG. 1 is a schematic diagram of an NSSI sharing scenario according to this application.
Figure 2:
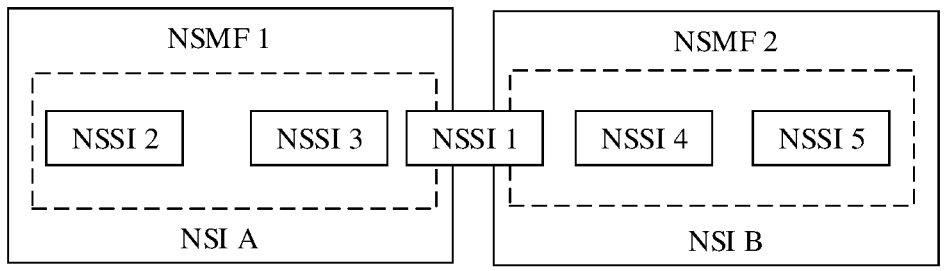
FIG. 2 is a schematic diagram of another NSSI sharing scenario according to this application.
Figure 3:
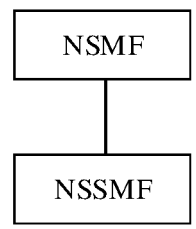
FIG. 3 is a schematic diagram of a system architecture according to this application.

In the embodiments of this application, a second network device is mainly responsible for managing a life cycle, performance, a fault, and the like of a network slice instance, orchestrating composition of the network slice instance, decomposing a requirement of the network slice instance into a requirement of each network slice subnet instance and/or network function, and sending a network slice subnet instance management request to a management entity of each network slice subnet. For example, the second network device may be a network slice management function (NSMF). A first network device is mainly responsible for receiving a network slice subnet requirement sent by the second network device, managing a network slice subnet instance, and orchestrating composition of the NSSI. For example, the first network device may be a network slice subnet management function (NSSMF). Optionally, the second network device may further include another functional module, and the NSMF is only a part of the second network device. The first network device may further include another functional module, and the NSSMF is only a part of the first network device. There are two scenarios in the prior art. Scenario 1: As shown in FIG. 1, an NSI identified as A has three NSSIs: an NSSI 1, an NSSI 2, and an NSSI 3, and an NSI identified as B has three NSSIs: the NSSI 1, an NSSI 4, and an NSSI 5. The NSSI 1 is shared by the NSI A and the NSI B, and both the NSI A and the NSI B are managed by an NSMF. In other words, the NSSI 1 is shared by a plurality of network slice instances managed by a same NSMF. In this case, the NSMF knows in advance all sharing situations of the NSSI, that is, all NSIs sharing the NSSI are managed by a same NSMF. When any NSI sharing the NSSI needs to modify the NSSI, the NSMF sends a modification request message for the NSSI to an NSSMF corresponding to the NSSI, and the NSSMF modifies the NSSI based on the modification request message. This may cause a negative impact on another NSI that shares the NSSI. Scenario 2: As shown in FIG. 2, an NSI identified as A has an NSSI 1, an NSSI 2, and an NSSI 3, and an NSI identified as B has the NSSI 1, an NSSI 4, and an NSSI 5. The NSSI 1 is shared by the NSI A and the NSI B. The NSI A is managed by an NSMF 1, and the NSI B is managed by an NSMF 2. In other words, the NSSI 1 is shared by a plurality of network slice instances managed by different NSMFs. In this case, when NSIs that share the NSSI are managed by different NSMFs, an NSMF managing an NSI that is to perform modification does not know a sharing status of the NSSI. That is, the NSMF considers that the NSSI is specific to the NSI, and therefore sends a modification request to an NSSMF. The NSSMF modifies the NSSI based on the modification request. However, because the NSSI is shared by a plurality of NSIs, when another NSI does not allow modification of the NSSI, but the NSSMF modifies the NSSI based on the modification request, a negative impact is caused on the another NSI that shares the NSSI. FIG. 3 is a diagram of a system architecture including an NSMF and an NSSMF.

In this application, "a plurality of" refers to two or more.

In addition, it should be understood that in the descriptions of this application, terms such as "first" and "second" are merely used for differentiation and description, but should not be understood as indicating or implying relative importance, or should not be understood as indicating or implying a sequence.

In the embodiments of this application, the first network device determines, based on a received first message, whether a first NSSI can be modified, and performs subsequent processing based on a result of the determining. Through a determining process, when the first NSSI is shared by a plurality of NSIs, a problem that directly modifying the first NSSI causes a negative impact on an NSI different from an NSI managed by the second network device can be avoided by the first module.

The following describes in detail a network slice instance modification solution provided in this application with reference to the accompanying drawings.

Figure 4:
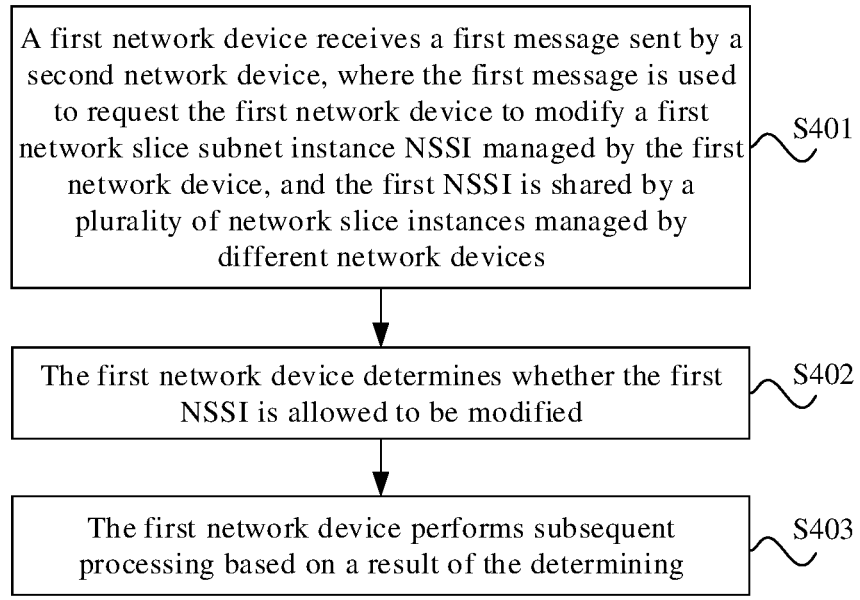
FIG. 4 is a flowchart of a network slice instance processing method according to this application.

FIG. 4 is a flowchart of a network slice instance processing method according to this application. The method includes the following steps.

S401. A first network device receives a first message sent by a second network device, where the first message is used to request the first network device to modify a first NSSI managed by the first network device, and the first NSSI is shared by a plurality of network slice instances managed by different network devices.

Specifically, the first message includes identification information of the first NSSI and updated related requirement information of the first NSSI. The related requirement information includes at least one of parameters such as a service level agreement (service level agreement, SLA), a network key performance indicator (network KPI), a type of a network slice subnet, quality of service (quality of service), a network topology (network topology), a resource requirement (resource requirements), and a network function related requirement. Optionally, the first message is referred to as a modification request message. The modification request message may further include identification information of an NSI to which the first NSSI belongs. The network KPI includes at least one parameter of latency (latency), coverage (coverage), a capacity (capacity), a throughput (throughput), reliability (reliability), a report success rate (report success ratio), and a delivery success rate (command success ratio). The report success rate may be a proportion of successful uplink packet transmission, the delivery success rate may be a proportion of successful downlink packet transmission, the coverage may be an area in which terminals are distributed, and the capacity may be a quantity of terminals that can be accommodated. The type of the network slice subnet includes enhanced mobile broadband (eMBB, enhanced Mobile Broadband), ultra-reliable low-latency communication (URLLC, Ultra-Reliable Low Latency Communications), massive internet of things (MIoT, Massive Internet of Things), and the like. The network function related requirement includes a type (type), a capacity (capacity), a location (location), a capability (capability), and the like.

S402. The first network device determines whether the first NSSI is allowed to be modified.

Optionally, the first network device determines that the first NSSI is allowed to be modified, or the first network device determines that the first NSSI is not allowed to be modified.

S403. The first network device performs subsequent processing based on a result of the determining.

Optionally, if the first network device determines that the first NSSI is allowed to be modified, the first network device modifies the first NSSI. If the first network device determines that the first NSSI is not allowed to be modified, the first network device creates a second NSSI, and the first network device configures the second NSSI. Specifically, the first network device adds the second NSSI to the NSI to which the first NSSI belongs, and deletes the first NSSI from the NSI.

In a possible implementation, after step S403, the method further includes sending, by the first network device, a second message to the second network device, to respond to the first message. Optionally, the second message is referred to as a modification response message.

According to the solution provided in this application, the first network device determines, based on the received first message, whether the first NSSI can be modified, and performs subsequent processing based on the result of the determining. Through a determining process, when the first NSSI is shared by a plurality of NSIs, a problem that directly modifying the first NSSI causes a negative impact on an NSI that is managed by another SMF and that shares the first NSSI can be avoided.

In a possible implementation, after the determining, by the first network device, that the first NSSI is not allowed to be modified, the method further includes sending, by the first network device, a third message to the second network device, where the third message carries related requirement information of the second NSSI that needs to be created, to indicate a support status of the first network device for a related requirement of the second NSSI, and receiving, by the first network device, a fourth message sent by the second network device, where the fourth message carries indication information, to indicate whether the first network device is allowed to create the second NSSI or whether the second network device accepts the related requirement information, carried in the third message, of the second NSSI that needs to be created. Optionally, the third message is referred to as a negotiation request message, and the fourth message is referred to as a negotiation response message.

Optionally, if the indication information that is specific to the related requirement of the NSSI and that is carried in the negotiation response message is a negative indication, the negotiation response message further includes related requirement information, proposed by the second network device, of the second NSSI that needs to be created.

Optionally, the second message includes identification information of the second NSSI and identification information of an NSI to which the second NSSI belongs.

The following describes the embodiments of this application in detail by using three specific embodiments.

Figure 5:
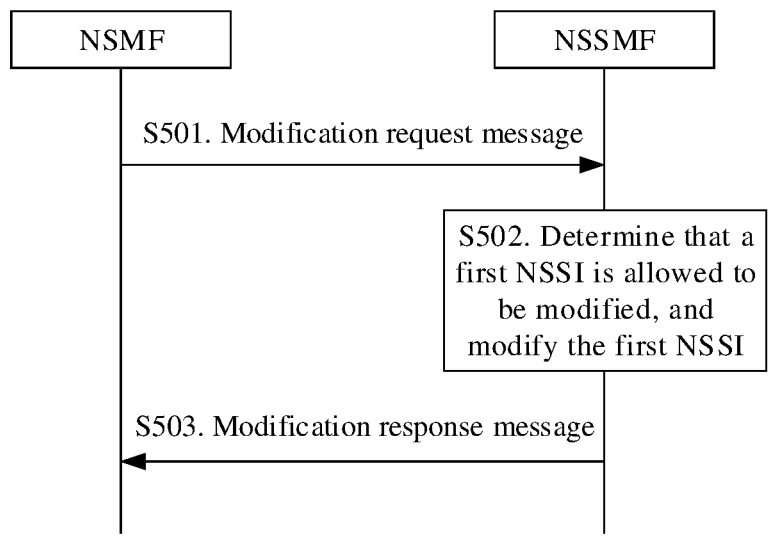
FIG. 5 is a flowchart of another network slice instance processing method according to this application.

A first specific embodiment is shown in FIG. 5.

S501. An NSMF sends a modification request message to an NSSMF, to request to modify a first NSSI.

Specifically, the modification request message includes the following parameters: an identifier of the to-be-modified first network slice subnet instance, for example, an NSSI ID, and an updated related requirement of the NSSI. Optionally, the modification request message may further include an identifier of a network slice instance to which the first NSSI belongs, for example, an NSI ID. A factor that triggers the NSMF to modify the first NSSI may be that the NSMF receives an external request, for example, receives a related network slice instance modification request from a user service management function. Alternatively, the NSMF autonomously determines, based on a running status of a network slice instance and a preset rule and policy, that the network slice instance needs to be modified, and further determines that a network slice subnet instance in the network slice instance needs to be modified.

S502. After the NSSMF receives the modification request message, the NSSMF determines that the first NSSI is allowed to be modified, and modifies the first NSSI.

Optionally, if the first NSSI belongs only to one NSI, or just like the cases described in the scenario 1 and the scenario 2 in the background, if all NSIs that share the first NSSI allow the first NSSI to be modified, the NSSMF determines that the first NSSI is allowed to be modified. For example, because the first NSSI belongs to a plurality of NSIs, the NSSMF managing the first NSSI may receive management by a plurality of NSMFs. When the NSSMF determines that the updated related requirement of the first NSSI is within a specified range of the plurality of NSIs, and modifying the first NSSI does not cause a negative impact on the plurality of NSIs, the NSSMF determines that the first NSSI is allowed to be modified. When an NSSI is allowed to be modified, the NSSMF modifies the NSSI based on an updated network slice subnet requirement in the modification request message.

S503. After modifying the first NSSI, the NSSMF sends a modification response message to the NSMF.

Optionally, the modification response message may carry indication information indicating whether the modification succeeds. For example, "1" is carried to indicate that the modification succeeds, and "o" is carried to indicate that the modification fails.

Figure 6:
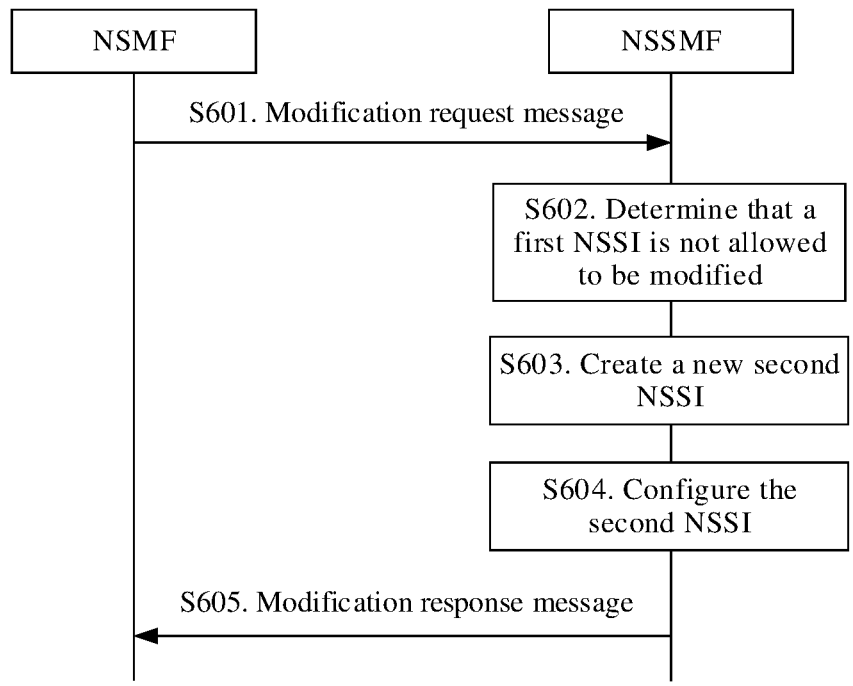
FIG. 6 is a flowchart of still another network slice instance processing method according to this application.

A second specific embodiment is shown in FIG. 6.

S601. An NSMF sends a modification request message to an NSSMF, to request to modify a first NSSI.

Specifically, parameters included in the modification request message are shown in the first embodiment, and details are not described herein again.

S602. After the NSSMF receives the modification request message, the NSSMF determines that the first NSSI is not allowed to be modified.

Optionally, if an updated network slice subnet related requirement exceeds a modification range allowed for the first NSSI, or one or more NSIs that share the first NSSI and that are managed by another NSMF do not allow modification of the NSSI, the NSSMF determines that the first NSSI is not allowed to be modified. For example, because the first NSSI belongs to a plurality of NSIs, the NSSMF managing the first NSSI may receive management by a plurality of NSMFs. When the NSSMF determines that an updated related requirement of the first NSSI exceeds a specified range of at least one of the plurality of NSIs, and modifying the first NSSI causes a negative impact on the at least one of the plurality of NSIs, the NSSMF determines that the first NSSI is not allowed to be modified.

S603. The NSSMF creates a second NSSI based on the updated network slice subnet related requirement in the modification request message.

S604. The NSSMF performs related configuration on the second NSSI.

Specifically, the NSSMF adds the newly created second NSSI to a first NSI based on a first NSI ID to which the first NSSI belongs. For example, the NSSMF configures a mapping relationship between a second NSSI ID and the first NSI ID for the newly created second NSSI, and adds the second NSSI to the first NSI. Optionally, the NSSMF deletes a mapping relationship between a first NSSI ID and the first NSI ID, and deletes the first NSSI from the first NSI. The newly created second NSSI belongs only to the first NSI, and does not belong to another NSI that shares the first NSSI.

S605. The NSSMF sends a modification response message to the NSMF.

Specifically, the modification response message includes an identifier of the newly created second NSSI, for example, the second NSSI ID. Optionally, the modification response message may further include an identifier of a network slice instance to which the second NSSI belongs, for example, the first NSI ID.

Figure 7:
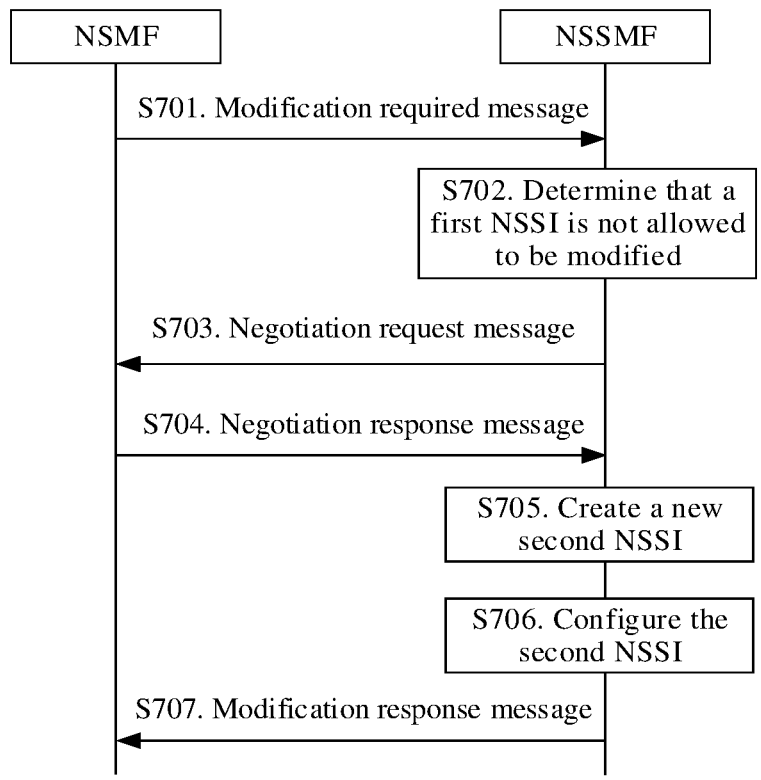
FIG. 7 is a flowchart of yet another network slice instance processing method according to this application.

A third specific embodiment is shown in FIG. 7.

S701. An NSMF sends a modification request message to an NSSMF, to request to modify a first NSSI.

Specifically, parameters included in the modification request message are shown in the first embodiment, and details are not described herein again.

S702. After the NSSMF receives the modification request message, the NSSMF determines that the first NSSI is not allowed to be modified.

Specifically, if an updated network slice subnet related requirement exceeds a modification range allowed for the first NSSI, or one or more NSIs that share the first NSSI and that are managed by another NSMF do not allow modification of the NSSI, the NSSMF determines that the first NSSI is not allowed to be modified.

S703. The NSSMF sends a negotiation request message to the NSMF.

Specifically, the negotiation request message carries related requirement information of an NSSI, to indicate whether the NSSMF supports a related requirement of the NSSI. Optionally, the negotiation request message further carries indication information indicating whether a new network slice subnet instance is allowed to be created.

S704. The NSMF sends a negotiation response message to the NSSMF.

Specifically, the negotiation response message carries related indication information. If the indication information that is specific to a related requirement of an NSSI and that is carried in the negotiation response message is a positive indication, the NSMF accepts the network slice subnet related requirement reported by the NSSMF. If the indication information that is specific to a related requirement of an NSSI and that is carried in the negotiation response message is a negative indication, the NSMF does not accept the network slice subnet related requirement reported by the NSSMF. Further, if the NSMF does not accept the network slice subnet related requirement reported by the NSSMF, the indication information carried in the negotiation response message may further include network slice subnet related requirement information that is proposed by the NSMF. Optionally, the NSSMF and the NSMF may perform negotiation for a plurality of times, that is, repeat steps S703 and S704, to determine final network slice subnet related requirement information.

Optionally, when the negotiation request message in step S703 carries indication information indicating whether a new subnet instance is allowed to be created. If the new subnet instance is allowed to be created, in this step, the NSMF and the NSSMF perform the foregoing negotiation process. When the new subnet instance is allowed to be created, the NSMF does not allow the NSSMF to create a new NSSI, and the negotiation response message may carry indication information that indicates a modification failure.

S705. The NSSMF creates a new second NSSI based on an updated network slice subnet related requirement in the negotiation response message.

S706. The NSSMF performs related configuration on the second NSSI.

Specifically, the NSSMF adds the newly created second NSSI to a first NSI based on a first NSI ID to which the first NSSI belongs. For example, the NSSMF configures a mapping relationship between a second NSSI ID and the first NSI ID for the newly created second NSSI, and adds the second NSSI to the first NSI. Optionally, the NSSMF deletes a mapping relationship between a first NSSI ID and the first NSI ID, and deletes the first NSSI from the first NSI. The newly created second NSSI belongs only to the first NSI, and does not belong to another NSI that shares the first NSSI.

S707. The NSSMF sends a modification response message to the NSMF.

Specifically, the modification response message includes an identifier of the newly created second NSSI, for example, the second NSSI ID. Optionally, the modification response message may further include an identifier of a network slice instance to which the second NSSI belongs, for example, the first NSI ID. Optionally, when the negotiation request message in step S703 carries indication information indicating that a new subnet instance is not allowed to be created, the modification response message is a negative indication.

Figure 8:
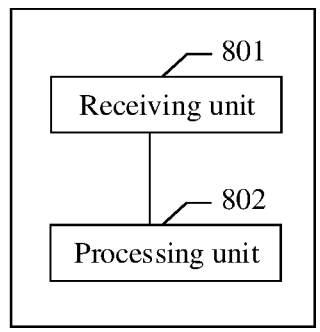
FIG. 8 is a schematic diagram of a network slice instance processing apparatus according to this application.

Based on a same inventive concept as the method embodiments, this application further provides a network slice instance processing apparatus. As shown in FIG. 8, the apparatus includes a receiving unit 801, configured to receive a first message sent by a second network device, where the first message is used to request a first network device, to which the receiving unit belongs, to modify a first network slice subnet instance (NSSI) managed by the first network device, and the first NSSI is shared by a plurality of network slice instances managed by different network devices, and a processing unit 802, configured to determine whether the first NSSI is allowed to be modified, and perform subsequent processing based on a result of the determining.

According to the solution provided in this application, the first network device determines, based on the received first message, whether the first NSSI can be modified, and performs the subsequent processing based on the result of the determining. Through a determining process, when the first NSSI is shared by a plurality of NSIs, a problem that directly modifying the first NSSI causes a negative impact on an NSI different from an NSI that is managed by the second network device and that shares the first NSSI can be avoided by the first module.

In a possible implementation, when performing the subsequent processing based on the result of the determining, the processing module is specifically configured to modify the first NSSI if determining that the first NSSI is allowed to be modified. Alternatively, when performing the subsequent processing based on the result of the determining, the processing module is specifically configured to create a second NSSI if determining that the first NSSI is not allowed to be modified, and configure the second NSSI after the second NSSI is created.

Specifically, the processing module adds the second NSSI to an NSI to which the first NSSI belongs, and deletes the first NSSI from the NSI.

In a possible implementation, the apparatus further includes a sending unit, configured to send a second message to the second network device.

Optionally, the sending unit is further configured to send a third message to the second network device after it is determined that the first NSSI is not allowed to be modified, where the third message carries related requirement information of the second NSSI that needs to be created, to indicate a support status of the first network device for a related requirement of the second NSSI. The receiving unit receives a fourth message sent by the second network device, where the fourth message carries indication information, to indicate whether the first network device is allowed to create the second NSSI or whether the second network device accepts the related requirement information, carried in the third message, of the second NSSI that needs to be created.

Optionally, if the indication information that is specific to the related requirement of the NSSI and that is carried in the negotiation response message is a negative indication, the negotiation response message further includes related requirement information, proposed by the second network device, of the second NSSI that needs to be created.

In a possible implementation, the first message includes identification information of the first NSSI and updated related requirement information of the first NSSI, where the related requirement information includes at least one of parameters such as a service level agreement, a key performance indicator, a type of a network slice subnet, quality of service, a network topology, a resource requirement, and a network function related requirement. The first message further includes identification information of an NSI to which the first NSSI belongs.

Optionally, the second message includes identification information of the second NSSI.

Optionally, the second message includes identification information of an NSI to which the second NSSI belongs.

Figure 9:
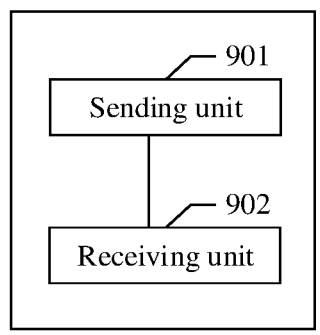
FIG. 9 is a schematic diagram of another network slice instance processing apparatus according to this application.

Based on the same inventive concept as the method embodiments, this application further provides another network slice instance processing apparatus. As shown in FIG. 9, the apparatus includes a sending unit 901, configured to send a first message to a first network device, where the first message is used to request the first network device to modify a first network slice subnet instance (NSSI) managed by the first network device, and the first NSSI is shared by a plurality of network slice instances managed by different network devices, and a receiving unit 902, configured to receive a second message sent by the first network device.

In a possible case, after the sending unit sends the first message to the first network device, the receiving unit is further configured to receive a third message sent by the first network device, where the third message carries related requirement information of the second NSSI that needs to be created, to indicate a support status of the first network device for a related requirement of the second NSSI. The sending unit is further configured to send and receive a fourth message to the first network device, where the fourth message carries indication information, to indicate whether the first network device is allowed to create the second NSSI or whether the apparatus accepts the related requirement information, carried in the third message, of the second NSSI that needs to be created.

In the embodiments of this application, division into modules is an example, and is merely logical function division and may be another division manner during actual implementation. In addition, function modules in the embodiments of this application may be integrated into one processor, or each of the modules may exist alone physically, or at least two modules may be integrated into one module. The integrated module may be implemented in a form of hardware, or may be implemented in a form of a software functional module.

Figure 10:
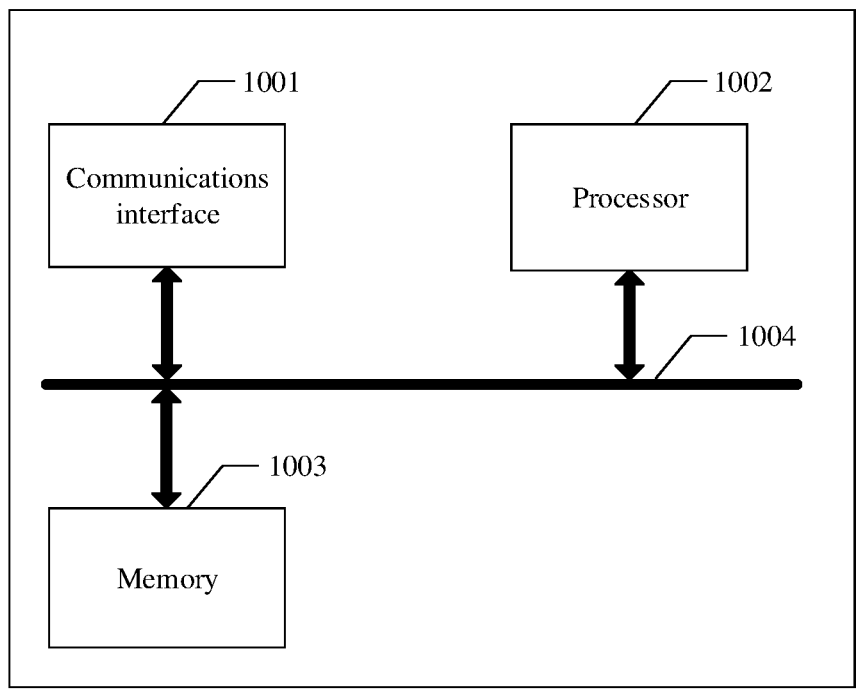
FIG. 10 is a structural diagram of hardware of a network slice instance processing apparatus according to this application.

When the integrated module may be implemented in a form of hardware, as shown in FIG. 10, the network slice instance modification apparatus may include a processor 1002. Hardware of an entity corresponding to the module may be the processor 1002. The processor 1002 may be a central processing module (central processing unit, CPU), a digital processing module, or the like. The network slice instance modification apparatus may further include a communications interface 1001, and the processor 1002 receives and sends data by using the communications interface 1001. The apparatus further includes a memory 1003, configured to store a program executed by the processor 1002. The memory 1003 may be a non-volatile memory, for example, a hard disk drive (HDD) or a solid-state drive (SSD), or may be a volatile memory, for example, a random-access memory (RAM). The memory 1003 is any other medium that can be used to carry or store expected program code that is in a form of an instruction or a data structure and that is accessible to a computer, but is not limited thereto. The processor 1002 is configured to execute the program code stored in the memory 1003, and may be specifically configured to perform the method described in the embodiment shown in FIG. 4.

In the embodiments of this application, a specific connection medium between the communications interface 1001, the processor 1002, and the memory 1003 is not limited. In the embodiments of this application, the memory 1003, the processor 1002, and the communications interface 1001 are connected by a bus 1004 in FIG. 10. In FIG. 10, the bus is represented by a thick line. The foregoing is merely an example for description. Connection modes of other components are not limited thereto. The bus may be classified into an address bus, a data bus, a control bus, and the like. For ease of representation, only one thick line is used to represent the bus in FIG. 10, but this does not mean that there is only one bus or only one type of bus.

An embodiment of the present invention further provides a computer-readable storage medium, configured to store a computer software instruction that needs to be executed by the processor. The computer software instruction includes a program that needs to be executed by the processor.

A person skilled in the art should understand that the embodiments of this application may be provided as a method, a system, or a computer program product. Therefore, this application may use a form of a hardware-only embodiment, a software-only embodiment, or an embodiment with a combination of software and hardware. Moreover, this application may use a form of a computer program product that is implemented on one or more computer-usable storage media (including but not limited to a magnetic disk memory, a CD-ROM, an optical memory, and the like) that include computer-usable program code.

This application is described with reference to the flowcharts and/or block diagrams of the method, the device (system), and the computer program product according to this application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by the computer or the processor of the any other programmable data processing device generate an apparatus for implementing a specific function in one or more processes in the flowcharts and/or in one or more blocks in the block diagrams.

These computer program instructions may be stored in a computer-readable memory that can instruct the computer or the any other programmable data processing device to work in a specific manner, so that the instructions stored in the computer-readable memory generate an artifact that includes an instruction apparatus. The instruction apparatus implements a specific function in one or more processes in the flowcharts and/or in one or more blocks in the block diagrams.

These computer program instructions may be loaded onto the computer or the any other programmable data processing device, so that a series of operations and steps are performed on the computer or the any other programmable device, thereby generating computer-implemented processing. Therefore, the instructions executed on the computer or the any other programmable device provide steps for implementing a specific function in one or more processes in the flowcharts and/or in one or more blocks in the block diagrams.

Definitely, a person skilled in the art can make various modifications and variations to this application without departing from the spirit and scope of this application. This application is intended to cover these modifications and variations of this application provided that they fall within the scope of the following claims and their equivalent technologies.

What is claimed is:

1. A network slice instance processing method, comprising:
receiving, by a first network device, a first message sent by a second network device, wherein the first message requests that the first network device modify a first network slice subnet instance (NSSI) managed by the first network device, and wherein the first NSSI is shared by a plurality of network slice instances (NSIs) managed by different network devices, and wherein the first message comprises updated related requirement information that is for the first NSSI and that includes at least one parameter for the first NSSI;
determining, by the first network device, whether the first NSSI is allowed to be modified; and
performing, by the first network device, subsequent processing according to a determination of whether the first NSSI is allowed to be modified.

2. The method according to claim 1, further comprising performing, after the performing the subsequent processing:
sending, by the first network device, a second message to the second network device, wherein the second message is a response to the first message.

3. The method according to claim 1, wherein the performing the subsequent processing comprises performing, in response to determining that the first NSSI is allowed to be modified:
modifying, by the first network device, the first NSSI.

4. The method according to claim 3, wherein the performing the subsequent processing based on a result of the determining comprises performing, in response to determining that the first NSSI is not allowed to be modified:
creating, by the first network device, a second NSSI.

5. The method according to claim 4, further comprising performing, after the creating the second NSSI:
configuring, by the first network device, the second NSSI.

6. The method according to claim 5, wherein the configuring the second NSSI comprises:
adding, by the first network device, the second NSSI to an NSI to which the first NSSI belongs; and
deleting the first NSSI from the NSI.

7. The method according to claim 4, further comprising performing, comprises performing, after determining that the first NSSI is not allowed to be modified:
sending, by the first network device, a third message to the second network device, wherein the third message carries first related requirement information of the second NSSI that needs to be created, wherein the first related requirement information indicates a support status of the first network device for a related requirement of the second NSSI; and
receiving, by the first network device, a fourth message sent by the second network device, wherein the fourth message carries indication information indicating whether the first network device is allowed to create the second NSSI or whether the second network device accepts the first related requirement information.

8. The method according to claim 7, wherein the indication information carried in the fourth message is a negative indication, and wherein the fourth message further comprises second related requirement information, proposed by the second network device, of the second NSSI that needs to be created.

9. The method according to claim 1, wherein the first message further comprises identification information of the first NSSI, and wherein the at least one parameter comprises at least one of a service level agreement, a key performance indicator, a type of a network slice subnet, quality of service, a network topology, a resource requirement, or a network function related requirement.

10. A network slice instance processing method, comprising:
sending, by a second network device, a first message to a first network device, wherein the first message requests that the first network device modify a first network slice subnet instance (NSSI) managed by the first network device, and wherein the first NSSI is shared by a plurality of network slice instances (NSIs) managed by different network devices, and wherein the first message comprises updated related requirement information that is for the first NSSI and that includes at least one parameter for the first NSSI; and
receiving, by the second network device, a second message sent by the first network device, wherein the second message is a response to the first message.

11. The method according to claim 10, further comprising performing, wherein after the sending the sending the first message:
receiving, by the second network device, a third message sent by the first network device, wherein the third message carries first related requirement information of a second NSSI that needs to be created, wherein the first related requirement information indicates a support status of the first network device for a related requirement of the second NSSI; and
sending, by the second network device, a fourth message to the first network device, wherein the fourth message carries indication information indicating whether the first network device is allowed to create the second NSSI or whether the second network device accepts the first related requirement information.

12. The method according to claim 11, wherein the sending the fourth message to the first network device comprises the sending, in response to the second network device not accepting the first related requirement information, the fourth message to the first network device with the indication information comprising a negative indication, and further with the fourth message comprising second related requirement information, proposed by the second network device, of the second NSSI that needs to be created.

13. A system, comprising:
a first network device, comprising
a first processor; and
a first non-transitory computer readable medium storing a first program for execution by the first processor; and
a second network device, comprising:
a second processor; and
a second non-transitory computer readable medium storing a second program for execution by the second processor, the second program including second instructions to:
send a first message to the first network device, wherein the first message requests that the first network device modify a first network slice subnet instance (NSSI) managed by the first network device, wherein the first NSSI is shared by a plurality of network slice instances (NSIs) managed by different network devices, and wherein the first message comprises updated related requirement information that is for the first NSSI and that includes at least one parameter for the first NSSI;

wherein the first program includes first instructions to:
receive the first message;
determine whether the first NSSI is allowed to be modified; and
perform subsequent processing according to a determination of whether the first NSSI is allowed to be modified.

14. The system according to claim 13, wherein the first program further includes additional instructions to send a second message to the second network device, wherein the second message is a response to the first message; and wherein the second program further includes additional instructions to receive the second message.

15. The system according to claim 13, wherein the first instructions to perform the subsequent processing include instructions to modify the first NSSI in response to the first network device determining that the first NSSI is allowed to be modified.

16. The system according to claim 15, wherein the first instructions to perform the subsequent processing include instructions to create a second NSSI in response to the first network device determining that the first NSSI is not allowed to be modified.

17. The system according to claim 16, wherein the first program further includes additional instructions to configure the second NSSI after creating the second NSSI.

18. The system according to claim 17, wherein the first instructions to configure the second NSSI include additional instructions for:

adding, by the first network device, the second NSSI to an NSI to which the first NSSI belongs; and
deleting the first NSSI from the NSI.

19. The system according to claim 16, wherein the first program further includes additional instructions to send, in response to determining that the first NSSI is not allowed to be modified, a third message to the second network device, wherein the third message carries first related requirement information of the second NSSI that needs to be created, the first related requirement information indicating a support status of the first network device for a related requirement of the second NSSI;

wherein the second program further includes additional instructions to:
receive the third message; and
send a fourth message to the first network device, wherein the fourth message carries indication information indicating whether the first network device is allowed to create the second NSSI or whether the second network device accepts the first related requirement information; and wherein the first program further includes additional instructions to receive the fourth message.

20. The system according to claim 19, wherein the second program further includes additional instructions to send the fourth message to the first network device, in response to the second network device not accepting the first related requirement information, with the indication information being a negative indication, and further with the fourth message comprising second related requirement information, proposed by the second network device, of the second NSSI that needs to be created.

* * * * *